(12) United States Patent
Blass

(10) Patent No.: US 12,300,861 B2
(45) Date of Patent: May 13, 2025

(54) SYSTEMS AND METHODS FOR GENERATING POWER

(71) Applicant: Central Intelligence Agency, Washington, DC (US)

(72) Inventor: Samuel D. Blass, Paramus, NJ (US)

(73) Assignee: U.S. Department of Energy, Washington, DC (US)

( * ) Notice: Subject to any disclaimer, the term of this patent is extended or adjusted under 35 U.S.C. 154(b) by 492 days.

(21) Appl. No.: 17/861,299

(22) Filed: Jul. 11, 2022

(65) Prior Publication Data

US 2024/0014419 A1 Jan. 11, 2024

(51) Int. Cl.
| | | |
|---|---|---|
| *H01M 8/04119* | (2016.01) | |
| *H01M 8/04014* | (2016.01) | |
| *H01M 8/04082* | (2016.01) | |

(52) U.S. Cl.
CPC ... *H01M 8/04164* (2013.01); *H01M 8/04014* (2013.01); *H01M 8/04201* (2013.01)

(58) Field of Classification Search
CPC ......... H01M 8/04164; H01M 8/04014; H01M 8/04201
See application file for complete search history.

(56) References Cited

U.S. PATENT DOCUMENTS

| | | | |
|---|---|---|---|
| 6,582,676 | B2 | 6/2003 | Chaklader |
| 7,947,096 | B2 | 5/2011 | Tonca |
| 2001/0015077 | A1 | 8/2001 | Potnis et al. |
| 2010/0077783 | A1* | 4/2010 | Bhatti .................. F24F 3/1423 62/271 |
| 2015/0233589 | A1* | 8/2015 | Betts .................... B01D 61/363 202/180 |
| 2015/0353377 | A1 | 12/2015 | Al-Sulaiman et al. |
| 2019/0024216 | A1 | 1/2019 | Giri et al. |

OTHER PUBLICATIONS

Reaction of Aluminum with Water to Produce Hydrogen—2010 Update, Jun. 1, 2011, Petrovic, et al.
A Review: Feasibility of Hydrogen Generation from the Reaction Between Aluminum and Water for Fuel Cell Applications, May 2013, Huang et al.

(Continued)

*Primary Examiner* — Stewart A Fraser
(74) *Attorney, Agent, or Firm* — Jonathan W. Parthum

(57) ABSTRACT

A fuel cell supply device having a dehumidifier, a chamber, a first heat exchanger, and a reactor. The dehumidifier is connected to the chamber via a first conduit and a second conduit and is connected to the first heat exchanger via a third conduit. Further, the dehumidifier is configured to receive a first solution from the chamber via the first conduit. The chamber is connected to the first heat exchanger via a fourth conduit and is configured to receive from the dehumidifier a second solution via the second conduit. The first heat exchanger is connected to the reactor via a fifth conduit and is configured to receive and cool vapor from the chamber via the fourth conduit and cool dehumidified air received from the dehumidifier via the third conduit. The reactor is configured to connect to a fuel cell and receive cooled vapor from the first heat exchanger via the fifth conduit. Further, the reactor encloses therein one or more metals to react with the cooled vapor.

20 Claims, 6 Drawing Sheets

(56) References Cited

OTHER PUBLICATIONS

Instant Hydogen Production using Ga—In—Sn—Bi Alloy-Activated Al-water Reaction for Hydrogen Fuel Cells, Jan. 28, 2020, Xu et al.
Harvesting Water From Air: Using Anhydrous Salt with Sunlight, Apr. 2, 2018, Li et al.
Performance Review of Aqueous Calcium Chloride Liquid Desiccant Based Air Dehumidifier for HVAC Applications:A Review, Dec. 2015, Badrakia, H.C.
An Overview of Open-Cycle Desiccant-Cooling Systems and Materials, Feb. 1, 1982, Collier et al.

\* cited by examiner

SYSTEMS AND METHODS FOR GENERATING POWER

GOVERNMENT INTEREST STATEMENT

The United States Government has rights in this invention pursuant to the employer-employee relationship of the Government to at least one inventor.

BACKGROUND

Hydrocarbon fuel is a readily available fuel source used throughout the world to power various systems and infrastructure. However, hydrocarbon fuel only has an approximate shelf life of one year and carries with it the risk of explosion and adverse ecological impact. This creates additional complexities and expense when shipping this type of fuel to various remote geographical locations. Accordingly, generating and maintaining power at remote locations and/or locations with minimal or no functioning grid infrastructure is difficult using hydrocarbon fuel.

SUMMARY

Described herein are systems and methods for generating power by supplying a fuel cell, particularly in remote locations and/or locations without existing infrastructure or those with a minimally functioning grid. To generate such power, transportable fuel cells can be shipped to such locations and energized via the introduction of locally produced hydrogen. In exemplary implementations, this hydrogen can be sourced from atmospheric water existing in a variety of geographic locations thereby offsetting the shelf life and ecological downsides of hydrocarbon fuel while also greatly reducing shipping complexity and expense.

DETAILED DESCRIPTION

Figure 1:
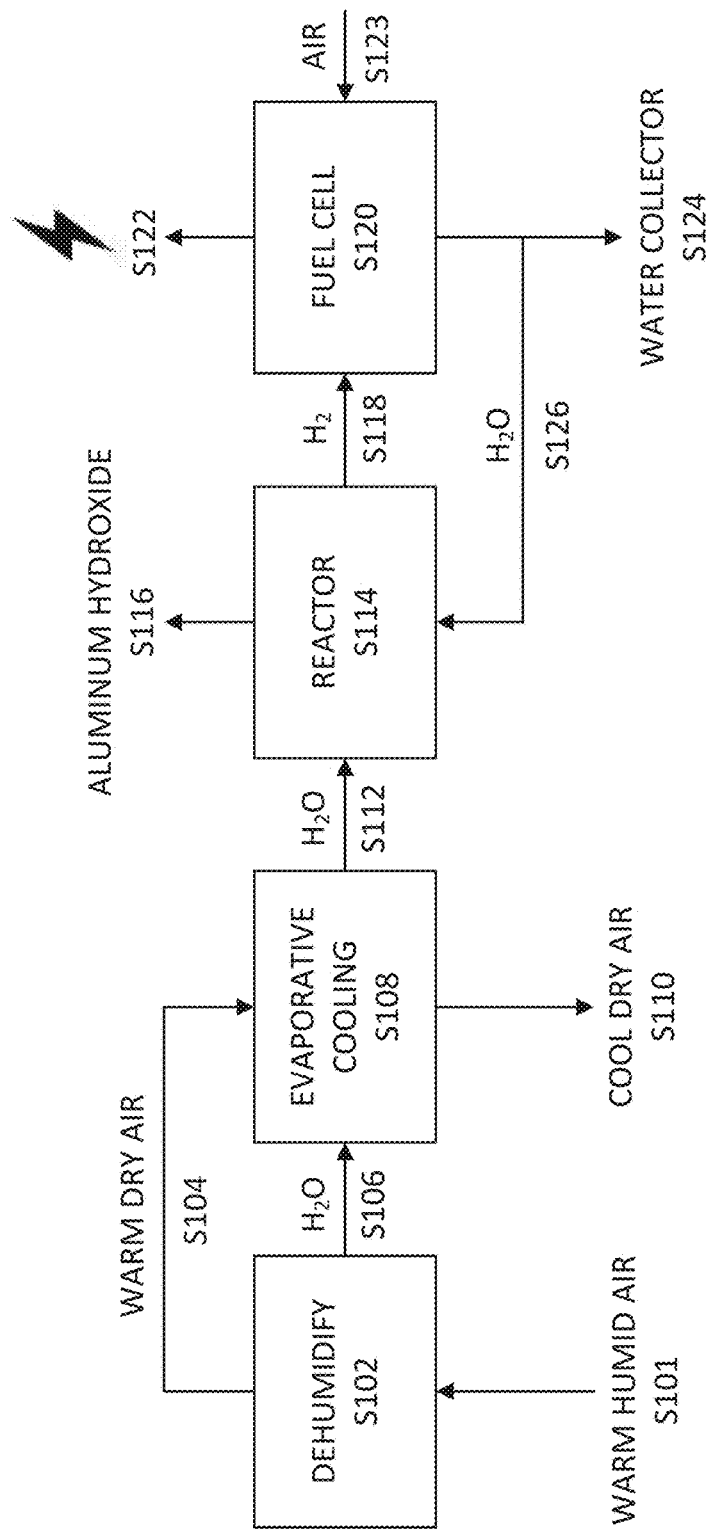
FIG. 1 illustrates a method for generating power in a fuel cell according to one example.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The terminology used herein is for describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Additionally, as used herein, any reference to a range of values is intended to encompass every value within that range, including the endpoints of said ranges, unless expressly stated to the contrary.

Referring now to the drawings, wherein like reference numerals designate identical or corresponding parts throughout the several views, the following description relates to a dedicated system and method for finding activities that suits personal preference and schedule of a user and for managing activities that the user signed up for participation.

Figure 2:
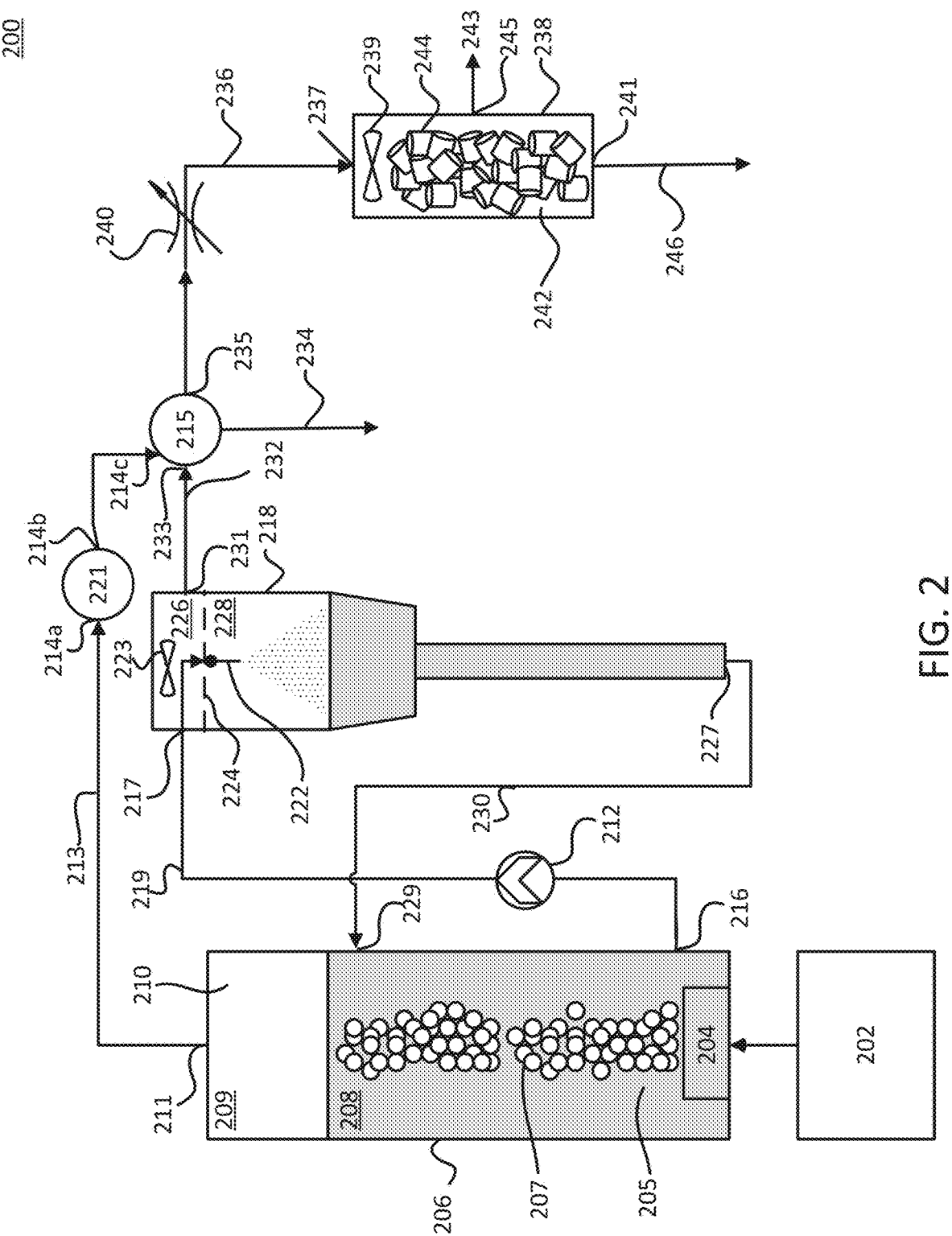
FIG. 2 illustrates a fuel cell supply device configured to supply a fuel cell according to one example.
Figure 3:
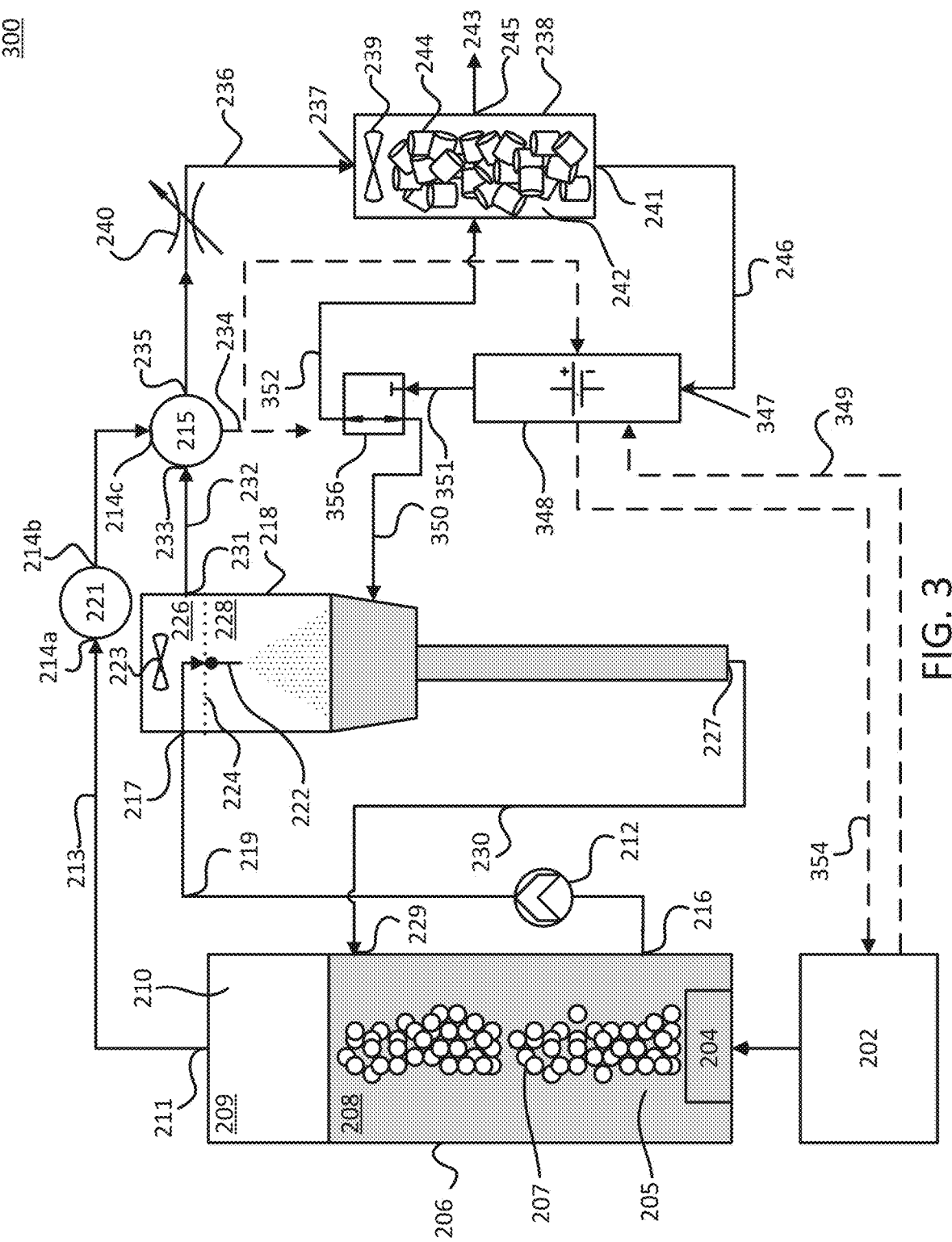
FIG. 3 illustrates a fuel cell system configured to generate power according to one example.

FIG. 1 illustrates a method 100 for supplying a fuel cell and generating power according to one example. FIG. 2 illustrates a fuel cell supply device 200 configured to supply a fuel cell 348 (FIG. 3) according to one example. FIG. 3 illustrates a fuel cell system 300 configured to generate power. As the method 100 illustrates steps performed via the device 200 and system 300, FIGS. 1-3 are described contemporaneously herein to provide a description of exemplary implementations. At step S101, air external to the device 200 is pulled from the atmosphere via one or more pumps 202 and pumped into a sparger 204 contained within a bath 206 which acts as a dehumidifier as further described herein. The pump 202 can be powered initially via an external power source (not shown) whereas the amount of power required from the external power source to continue operation of the pump 202 can change over time based on the amount of power generated by the fuel cell 348 as described further herein. A variety of pumps 202 can be used such as a typical air mattress pump, or a Dayton 1TDR6 or a Dayton 1TDT8 blower produced by OEM Corporation of Dayton, Ohio.

The bath 206 acts as a dehumidifier for dehumidifying at step S102 the external air received from the pump 202 in step S101. The bath 206 can be at least partially filled with a saturated salt solution 205, saturated by water in one embodiment, such that the external air pumped into the bath 206 via pump 202 creates bubbles 207 in the saturated salt solution 205 when sparged by the sparger 204 located at a proximal end of the bath 206. The sparger 204 can be any sparger as understood by one of ordinary skill in the art that ensures the distribution of the external air in the saturated salt solution 205 to create an effective gas/liquid contact surface area while reducing the time and amount that is needed to divide the gas in the saturated salt solution 205. Factors for determining the specifications of the sparger 204 include various factors such as the size of the pump 202 with respect to air flow, saturated salt solution 205 pressure and temperature, air exit velocity and air compressor capacity. One example of a sparger 204 is a Nanoporex sparger made by Diva Envitec Pvt Ltd of Mumbai India or an in-tank sparger manufactured by Mott Inc. of Farmington CT.

The saturated salt solution 205 consists of at least one of lithium chloride, calcium chloride, magnesium chloride or lithium bromide which act as a liquid desiccant to draw humidity out of the sparged air. As illustrated in FIG. 2 and in exemplary implementations, the bath 206 can include the saturated salt solution 205 which creates a first volumetric portion 208 filled with the saturated salt solution 205 and a second volumetric portion 209 at a distal end of the bath 206 with little or no salt solution. Second volumetric portion 209 initially contains internal air of the bath 206 and upon use of the device 200 contains dehumidified air 210 arising out of the sparging through the saturated salt solution 205. Due to the small path of mass transport of external air via sparger 204, water vapor in the gas bubbles 207 rapidly reaches equilibrium with the surrounding saturated salt solution 205 which results in the generation of air with less relative humidity (RH) or in other words the dehumidified air 210. Another example of a dehumidifier which can be used at step S102 to dehumidify external air received from the pump 202 via a sieve plate is that described in U.S. Pat. No. 9,643,102, the entirety of which is herein incorporated by reference. Another example of a dehumidifier which can be used in the device 200 in place of the bath 206 is the SP 600 dehumidifier produced by Alfa Laval Kathabar Inc. of Buffalo, New York. Alfa Laval Kathabar also manufactures solid desiccant system which could act as a substitute for or be used in addition to bath 206. These systems use a rotating desiccant wheel. As the wheel rotates, portions of the wheel pass through a region where air dehumidifies and another region where the portion is heated to regenerate the desiccant. Accordingly, in another embodiment, a solid desiccant wheel could be used to perform the dehumidification process S102 to scavenge atmospheric humidity based on the atmospheric conditions such as on low humidity days. Heat generated by the fuel cell 348 (FIG. 3) could be used to regenerate the desiccant wheel as described further herein.

At step S104, the dehumidified air 210 is output from the bath 206 via an outlet 211 and passed via a conduit 213 to an inlet 214a of a heat exchanger 221 which processes the dehumidified air 210 with ambient air (via an ambient air input and output not shown) to bring the dehumidified air 210 to ambient temperature at which point it is output from the heat exchanger 221 via an outlet 214b and passed to a heat exchanger 215 connected downstream via an inlet 214c. The heat exchangers could be any type of heat exchanger as would be understood by one of ordinary skill in the art. A water-hydrated salt solution generated from the sparged external air is also output from the bath 206 via a second outlet 216 to an inlet 217 of a chamber 218 via a conduit 219 at step S106. The water-hydrated salt solution can be passed within the conduit 219 by a liquid pump 212 such as a High-Accuracy Metering Pump for Chemicals produced by McMaster-Carr of Santa Fe Springs California. The order of steps S104 and S106 in which the dehumidified air and the hydrated salt solution, respectively, are output from the bath 206 is immaterial and can be contemporaneous or otherwise. The conduits 213 and 219, and other conduits described herein, can be any conduit as would be understood by one of ordinary skill in the art for containing and transporting a gas and/or liquid, respectively, such as metallic and/or PVC piping.

Evaporative cooling of the dehumidified air 210 output to the heat exchanger 215 and the water-hydrated salt solution output to the chamber 218 takes place at step S108. Here, the water-hydrated salt solution is received at the inlet 217 of the chamber 218 and passed through a nebulizer 222 contained within the chamber 218. The chamber 218 can be filled with a dry inert gas such as nitrogen. Alternatively, a vacuum could be used within the chamber 218. The nebulizer 222 can be any nebulizer as understood by one of ordinary skill in the art, such as an ultrasonic wave nebulizer or jet nebulizer, which breaks up the incoming water-hydrated salt solution into a fine mist for distribution within the chamber 218. Here, the flash vaporization of water should be such that the salt does not crystallize to avoid clogging of the system 200. Optionally, a fan 223 can be included within the chamber 218 in the first volumetric portion 226. The fan 223 can circulate the inert gas within the chamber 219 from the droplet-free first volumetric portion 226 and push it through the nebulizer to the second volumetric portion 228. This creates a circulating convective current that also forces the water vapor that forms in the second volumetric portion 228 through the droplet catcher 224 to the first volumetric portion 226 and on to the heat exchanger 215.

A droplet catcher 224 can be included within the chamber 218 and in one example is affixed perpendicularly across a width of the chamber 218 at a proximal end of the chamber thereby bifurcating the chamber 218 into a first volumetric portion 226 and second volumetric portion 228. The term droplet catcher 224 should take its ordinary meaning as would be understood by one of ordinary skill in the art and is also known as a mist eliminator, aerosol remover, fog catcher, fog trap and fog collector. One example can be found in U.S. Pat. No. 9,352,258, the entirety of which is herein incorporated by reference.

The second volumetric portion 228 confined by the droplet catcher 224 collects droplets expelled by the nebulizer 222 which in one example distributes the nebulized water-hydrated salt solution in the second volumetric portion 228. Here, the small droplet size created by the nebulizer 222 and the interaction of the water-hydrated salt solution with the nitrogen contained in the chamber 218 causes excess water to evaporate from the droplets contained within the second volumetric portion 228 due to the lower partial pressure of water while also causing the inputted water-hydrated salt solution to revert to its initial concentration from bath 206. Therefore, unlike other liquid desiccant systems, the saturated salt solution 205, or liquid desiccant, is regenerated by exposure to a dry inert gas as opposed to requiring energy input to regenerate the saturated salt solution 205 via heating. However, in one embodiment, heat produced by the fuel cell 348 could be returned to the chamber 218 to provide additional facilitation of the liquid desiccant regeneration. Accordingly, the chamber 218 includes an outlet 227 connected to a conduit 230 through which the regenerated salt solution from the second volumetric portion 228 of the chamber 218 can be recycled back to the bath 206 via inlet 229 to be used for additional dehumidification of incoming air.

Cool water vapor created by the evaporation of the droplets within the chamber 218 can be output via an outlet 231 to the heat exchanger 215, via a conduit 232 and input 233 to be combined with the ambient temperature air received from the heat exchanger 221 via inlet 214c. Here, the heat exchanger 215 can further cool the ambient temperature air received from heat exchanger 221 along with the water vapor received from the chamber 218 and route the cooled air out of the device 200 via a conduit 234 at optional step S110 to provide cooled air to existing infrastructure, such as an HVAC unit, to further reduce the electrical footprint required when in remote locations and/or areas without suitable grid infrastructure.

The water vapor remaining within the heat exchanger 215 is output via outlet 235 at step S112 via a conduit 236 to an inlet 237 of a reactor 238 for processing at step S114. In one example, the reactor 238 is a container 242 having stored therein a packed bed of reactive aluminum alloy pellets 244 which readily reacts with the water vapor to generate aluminum hydroxide and alumina (or some combination of the two), and hydrogen as would be understood by one of ordinary skill in the art. The container 242 may be any shape, such as spherical or cylindrical, based on a desired packing density and can be made of non-metallic materials, such as fiber-reinforced plastic, to avoid any potential hydrogen embrittlement of the container 242 walls. In one example, the reactive aluminum pellets 244 are comprised of aluminum mixed with tin and/or bismuth which aids in reducing passivation of the reactive aluminum pellets 244. One such alloy derived from scrap aluminum that can be used is described in U.S. Pat. No. 11,198,923, the entirety of which is herein incorporated by reference. The reactive aluminum alloy pellets 244 can be of various sizes taking into account factors such as the amount of surface area available to capture water vapor and the pressure drop due to lower void space within the container 242. Upon generation of the hydrogen by the reactor 238, the hydrogen can be output via an outlet 241 to the fuel cell 348 of the system 300 at step S118 via a conduit 246.

Optionally, a fan 239 may be included within the reactor 238 to facilitate the dispersion of the water vapor therein for enhanced reaction with the reactive aluminum alloy pellets 244. The fan may be powered externally via solar energy, by the fuel cell 348 (FIG. 3) or by another energy source. The aluminum hydroxide can be emitted from the reactor 238 to a conduit 243 via an outlet 245 at step S116 during and/or after power production and processing of the reactive aluminum alloy pellets 244. Further, in certain embodiments, the reactor 238 is configured to be removably affixed to conduit 236 and a conduit 246 such that additional reactor container 242 cartridges can be used to replenish the supply of reactive aluminum alloy pellets 244 as reaction efficiency wanes.

As illustrated in FIG. 3, once the hydrogen is generated by the reactive aluminum alloy pellets 244, the hydrogen is output by the device 200 at outlet 241 as feedstock to the fuel cell 348 of the system 300 via the conduit 246 at step S118. The hydrogen, along with external air received a step S123, react within the fuel cell 348 at step S120 to generate electricity, heat and water. Hydrogen fuel cells produce electricity by combining hydrogen and oxygen atoms. The hydrogen reacts with oxygen across an electrochemical cell to produce electricity at step S122. The electricity generated by the fuel cell 348 is output at step S122 and can be used in a variety of ways depending on the size of the fuel cell. For example, the electricity can be output to power any number of electronic devices or connected infrastructure to provide operational power, particularly in remote locations or areas without proper grid infrastructure. Additionally, part or all of the electricity can be output via an optional electrical conduit line 354 connecting the fuel cell 348 and the pump 202 such that power produced by the fuel cell 348 can be used to power the pump 202 thereby enhancing the self-contained efficiency of the system 300 and reducing the reliance on external power sources and associated issues. Further, the air received by the fuel cell 348 at step S123 may be provided via a conduit 349 by pump 202 and/or received via conduit 234 from heat exchanger 215. Using the air cooled and output at step S110 is advantageous as the salt solution 205 will have cleaned the air during the S102 process. The salt solution 205 will strip out contaminants/pollutants that could poison the fuel cell 348. Thus, sourcing oxygen via conduit 234 can prolong the life of the fuel cell 348 and improve system 300 efficiency. The sourcing of oxygen via conduit 234 can be alternative to or in addition to using conduit 234 to supply external infrastructure.

Water and heat are also byproducts of the reaction between the hydrogen and the fuel cell 348 which can be efficiently used or recycled. For example, the heat generated by the fuel cell 348 can be used to power an absorption refrigerator for additional air cooling. Similarly, in another embodiment, heat from the fuel cell 348 could be used to heat the desiccant in the chamber 218 to help boil off water. The water vapor stream could then be cooled to condense the water at which point it could be passed to another evaporative cooler. The water generated by the fuel cell 348 can be transmitted to a water collector at step S124 to collect drinking water potentially needed in remote locations and/or recycled via a conduit 350 back to the chamber 218 to be recycled back into the saturated salt solution 205 thereby reducing the amount of atmospheric water needed within the bath 206 which in turn reduces the power requirements of the pump 202 while also increasing the amount of power produced by the system 300. Additionally, or in the alternative, an optional return conduit 352 may also be connected to the fuel cell 348 to recycle water from the fuel cell 348 back to the reactor 238 to multiply energy levels of the device 200 as the device 200 will not have to work as hard to harvest water from the ambient air via pump 202 for reactor 238 feedstock. Conduit 352 may be included in addition to conduit 350 or as an alternative conduit line in place of conduit 350. If both conduits 350 and 352 are implemented when operating the system 300, a three-way valve 356, such as a ball valve, can be located downstream of the fuel cell 348 to receive water via conduit 351 but upstream of the bath 206 and reactor 238 to control the flow of water either back to the reactor 238 via conduit 352, the chamber 218 via conduit 350, or both thereby allowing control over the power production and efficiency of the system 300 based on a variety of factors specific to the remote location including temperature and RH. The valve 356 may be manually operated, remotely operated or controlled by a computer via artificial intelligence to optimize performance based on incoming data from the system 300 as would be understood by one of ordinary skill in the art. Interfaces between the fuel cell 348, conduit lines 352 and 350, and the reactor 238 and chamber 218 are such that they share common connectors for easy setup and customization of the device 200 and system 300. Thus, conduit 350 or conduit 352 may be attached to the fuel cell 348 to respectively flow water from the fuel cell 348 solely to the chamber 218 or reactor 238 based on factors specific to the remote location. Accordingly, the device 200 and system 300 contain various tiers of complimentary efficiencies to save energy through recycling as opposed to a system which requires hydrocarbon fuel.

In one embodiment of the device 200, a valve 240, such as a restrictor valve or flow control valve, can be positioned in the conduit 236 downstream of the heat exchanger 215 to control the flow of water vapor to the reactor 238. This affords the device 200 the ability to throttle the amount of power that is being generated by the fuel cell 348 by controlling the amount of water which reacts with the reactive aluminum alloy pellets 244 in the reactor 238. The valve 240 can be a manual valve for use by an operator or a valve connected to a servo motor thereby enabling remote operation from a distance. Optionally the valve can be automatically controlled via artificial intelligence as previously described herein.

In one embodiment, a heat exchanger (not shown) could be included within the conduit 219 to cool the water-hydrated salt solution output from the bath 206 upstream of the chamber 218 using ambient air. In addition to, or alternatively (not shown), conduit 232 can bypass heat exchanger 215 and be connected directly to valve 240. Outlet 227 can be connected to inlet 233. Conduit 230 can connect outlet 235 with inlet 229. Conduits 213 and 234 remain connected to heat exchanger 215 as previously described herein. In this configuration, heat exchanger 215 transfers heat from the ambient air inside conduit 213 to the cool regenerated salt solution entering heat exchanger 215 from chamber 218 through outlet 227. The cooled dry air exits heat exchanger 215 via conduit 234.

The efficiency of the device 200 is in relation to the amount of humidity in the atmosphere in the location in which the device 200 is implemented. Thus, the more water held in the ambient atmosphere (i.e. the more humidity in the air), the less work required by the device 200 to extract the same amount of water. For example, calculations indicated that on a 70-degree Fahrenheit day at 60% RH, the volumetric electrical energy density of reactive aluminum alloy is about the same as that of diesel. This energy density only increases when the air conditioned and cooled by the device 200 is introduced into co-located HVAC infrastructure by reducing the air conditioning energy requirement. Recycling the fuel cell 348 water back into the device 200 as described herein provides additional enhanced effective electrical energy densities.

Figure 4A:
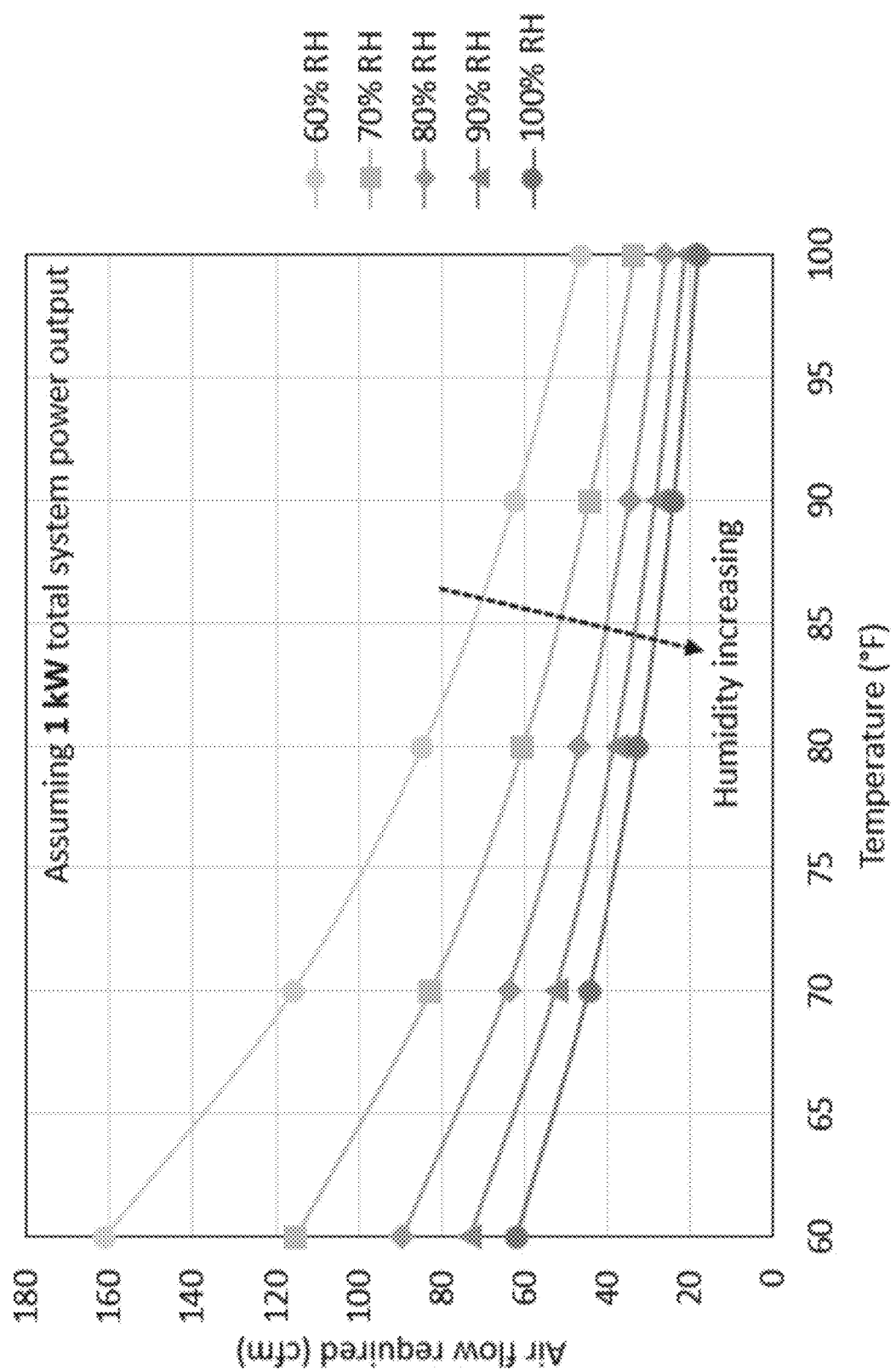
FIG. 4A illustrates the amount of airflow required to sustain a predetermined amount of power production from a material according to one example.

FIG. 4A illustrates the amount of airflow to sustain a predetermined amount of power production from a reactive aluminum alloy, such as aluminum-bismuth, according to one example. As shown in the exemplary results illustrated in FIG. 4A, as the humidity increases, less air flow is required to sustain power production as water is more readily generated by the device 200 for eventual processing and power production.

Figure 4B:
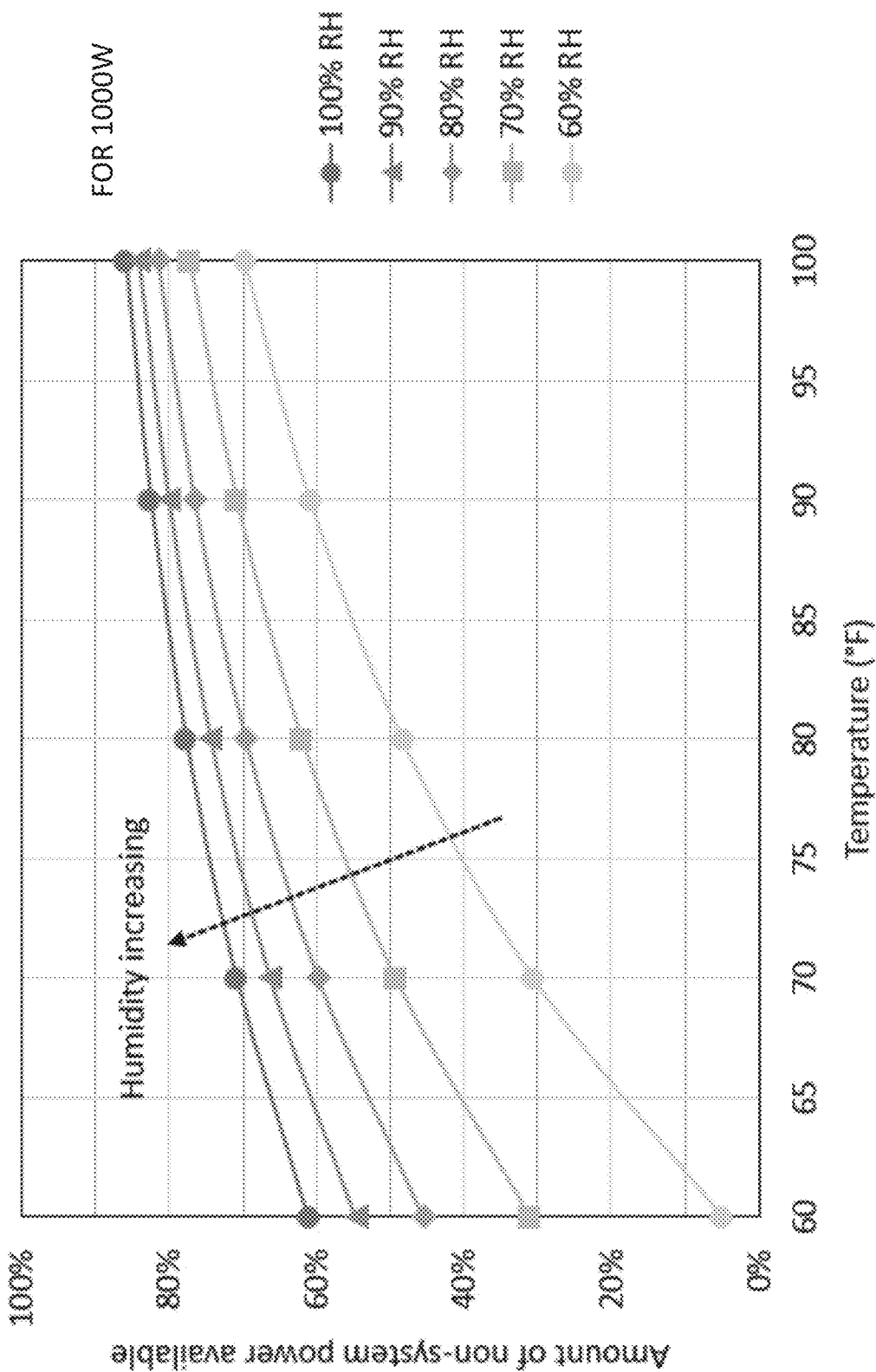
FIG. 4B illustrates the amount of power available beyond that required to drive the system of FIG. 3 according to one example.

FIG. 4B illustrates exemplary calculation data indicating the amount of power available beyond that used to drive the system 300 according to one example. As illustrated, the power available beyond that used to drive the system 300 increases as the temperature and humidity increase. The more water the air can hold, the less the system 300 has to work to extract the requisite amount of water thereby providing excess power available for other purposes.

Figure 4C:
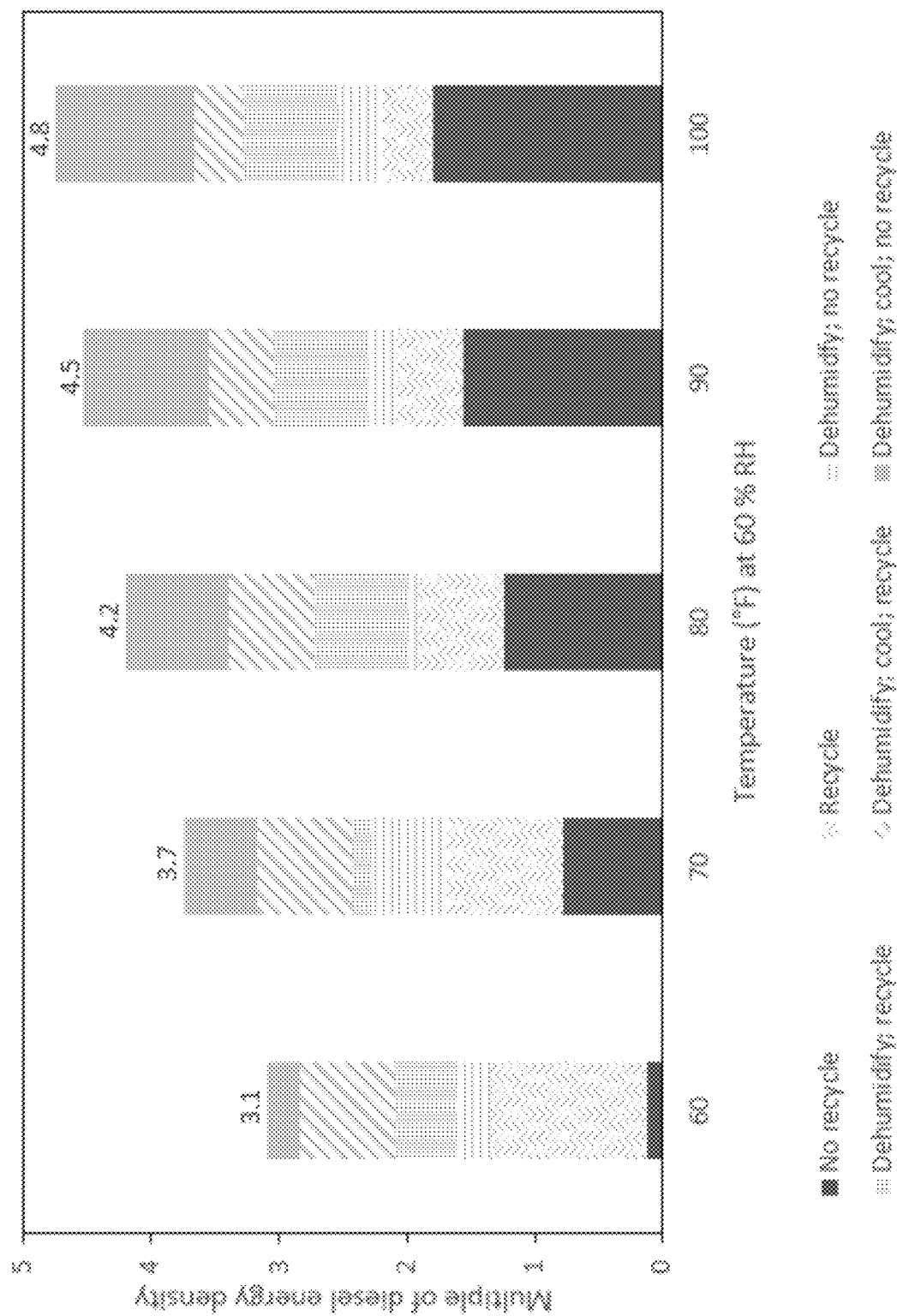
FIG. 4C illustrates energy multiples using the system and methods described herein in relation to hydrocarbon fuel according to one example.

FIG. 4C illustrates the efficacies described herein of system 300 by presenting exemplary analysis data indicating energy density multipliers using the system 300 and method 100 as opposed to diesel. As illustrated, the bottom-most portion of each column represents a system 300 that collects water formed in the fuel cell 348 without recycling the water back into the chamber 218. This multiplier then increases based on a combination of whether or not the water is recycled and cooling of associated infrastructure takes place. For example, dehumidifying coupled with cooling without recycling increases the multiplier the most in step with an increase in temperature and humidity.

The devices, systems and methods described herein provide numerous advantages and advancements in the field. Particularly, they provide the ability to provide power in remote locations using the existing environment without being dependent upon grid infrastructure. The power that is generated is emission-free and creates cooled air which can be used to reduce power requirements for cooling local infrastructure or act as a coolant for a variety of purposes such as storage of medical supplies. In addition to cooled air, water is an output of the systems and methods described herein therefor providing additional life-support in remote locations. Additionally, the ability to recycle fuel cell water back into the system to at least one of the chamber 218 or reactor 238 further multiplies the effective electrical energy density as compared to diesel thereby reducing a large percentage of fuel consumption on a volumetric basis. In addition to the envisioned fuel (i.e. reactive aluminum alloy) being a solid as opposed to a liquid and thereby requiring less complex shipping containers, the density advantages further facilitate drastic reductions in shipping volume thereby ensuring supply chains which do not suffer from volumetric complexity or geographical/geopolitical complexities. Aluminum transported to a remote location can also be functionally applied during travel (i.e. container or other support structure) and then processed on site to produce the reactive aluminum alloy for use by the device 200. Aluminum can also be locally sourced (i.e. from scrap) in remote locations more easily than hydrocarbon fuel and has a far superior shelf life to that of the one year shelf life of hydrocarbon fuels. Safety of personnel, the environment and local population and infrastructure is also enhanced by using a metal fuel as opposed to explosive and environmentally hazardous hydrocarbon fuels. Local personnel can also benefit from the availability of water from the system which otherwise may not be available in such remote locations and/or areas without proper grid infrastructure. The ability to generate this water further reduces shipping volume as it is not required to be initially transported to the remote location.

Those of skill in the art will understand that numerous modifications and variations of the present invention are possible in light of the above teachings. It is therefore also understood that within the scope of the appended claims, the invention may be practiced otherwise than as specifically described herein.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and to enable others of ordinary skill in the art to understand the embodiments disclosed herein.

Exemplary implementations include:

A: A fuel cell supply device, comprising:
a dehumidifier; a chamber; a first heat exchanger; and a reactor,
the dehumidifier being connected to the chamber via a first conduit and a second conduit and being connected to the first heat exchanger via a third conduit, the dehumidifier being configured to receive a first solution from the chamber via the first conduit;
the chamber being connected to the first heat exchanger via a fourth conduit and being configured to receive from the dehumidifier a second solution via the second conduit,
the first heat exchanger being connected to the reactor via a fifth conduit and being configured to receive and cool vapor from the chamber via the fourth conduit and cool dehumidified air received from the dehumidifier via the third conduit,
the reactor being configured to connect to a fuel cell and receive cooled vapor from the first heat exchanger via the fifth conduit, the reactor enclosing therein one or more metals to react with the cooled vapor.

B: The device of A, wherein the dehumidifier is partially filled with the second solution to form a first volumetric portion having the second solution and a second volumetric portion without the second solution.

C: The device B, wherein the second conduit connects to the first volumetric portion approximate a distal end of the dehumidifier and the first conduit connects to the first volumetric portion approximate the second volumetric portion.

D: The device of A, wherein the second conduit includes a liquid pump downstream of the dehumidifier and upstream of the chamber.

E: The device of A, further comprising:
a second heat exchanger connected to the third conduit downstream of the dehumidifier and upstream of the first heat exchanger.

F: The device of A, wherein the chamber includes a fan.

G: The device of A, wherein the chamber includes a nebulizer connected to the second conduit.

H: The device of A, further comprising:
a flow control valve affixed in the fifth conduit downstream of the first heat exchanger and upstream of the reactor to control a flow of vapor therebetween.

I: The device of A, wherein the first heat exchanger is connected to an external system via a sixth conduit to output the cooled dehumidified air.

J: The device of A, wherein the one or more metals is a packed bed of aluminum alloy pellets.

K: The device of A, wherein chamber is connected to the fuel cell via an seventh conduit.

L: The device of A, wherein the reactor is connected to the fuel cell via an eighth conduit.

M: The device of A, further comprising:
a pump connected to the dehumidifier.

N: The device of Claim M, wherein the pump is configured to connect to the fuel cell via a ninth conduit.

O: The device of A, wherein the reactor includes a fan.

P: A fuel cell system, comprising:
a dehumidifier; a chamber; a first heat exchanger; and a reactor,
the dehumidifier being connected to the chamber via a first conduit and a second conduit and being connected to the first heat exchanger via a third conduit, the dehumidifier being configured to receive a first solution from the chamber via the first conduit;
the chamber being connected to the first heat exchanger via a fourth conduit and being configured to receive from the dehumidifier a second solution via the second conduit,
the first heat exchanger being connected to the reactor via a fifth conduit and being configured to receive and cool vapor from the chamber via the fourth conduit and cool dehumidified air received from the dehumidifier via the third conduit,
the reactor being connected to the fuel cell via a sixth conduit and configured to receive cooled vapor from the first heat exchanger via the fifth conduit, the reactor enclosing therein one or more metals to react with the cooled vapor, and
the fuel cell being configured to generate power based on reaction feedstock received from the reactor via the sixth conduit.

Q: The system of P, further comprising:
a pump connected to the dehumidifier,
wherein the pump is connected to the fuel cell to receive power therefrom.

R: The system of P, wherein the chamber is connected to the fuel cell via a seventh conduit.

S: The system of P, wherein the fuel cell is connected to the reactor via an eighth conduit.

T: A method for generating power, the method comprising:
receiving, in a dehumidifier having a first solution, ambient air;
generating, in the dehumidifier, dehumidified air and outputting the dehumidified air to a heat exchanger;
hydrating, in the dehumidifier and by the ambient air, the first solution and outputting a second solution to a chamber;
generating, in the chamber and from the second solution, a first cooled vapor and outputting the cooled vapor to the heat exchanger;
cooling, at the heat exchanger, the dehumidified air and the first cooled vapor and outputting a second cooled vapor to a reactor;
generating, at the reactor from the second cooled vapor, hydrogen and outputting the hydrogen to a fuel cell; and
generating, at a fuel cell, power from the hydrogen.

The invention claimed is:
1. A fuel cell supply device, comprising:
a dehumidifier; a chamber; a first heat exchanger; and a reactor,
the dehumidifier being connected to the chamber via a first conduit and a second conduit and being connected to the first heat exchanger via a third conduit, the dehumidifier being configured to receive a first solution from the chamber via the first conduit;

the chamber being connected to the first heat exchanger via a fourth conduit and being configured to receive from the dehumidifier a second solution via the second conduit, the first heat exchanger being connected to the reactor via a fifth conduit and being configured to receive and cool vapor from the chamber via the fourth conduit and cool dehumidified air received from the dehumidifier via the third conduit, the reactor being configured to connect to a fuel cell and receive cooled vapor from the first heat exchanger via the fifth conduit, the reactor enclosing therein one or more metals to react with the cooled vapor.

2. The device of claim 1, wherein the dehumidifier is partially filled with the second solution to form a first volumetric portion having the second solution and a second volumetric portion without the second solution.

3. The device of claim 2, wherein the second conduit connects to the first volumetric portion approximate a distal end of the dehumidifier and the first conduit connects to the first volumetric portion approximate the second volumetric portion.

4. The device of claim 1, wherein the second conduit includes a liquid pump downstream of the dehumidifier and upstream of the chamber.

5. The device of claim 1, further comprising:
a second heat exchanger connected to the third conduit downstream of the dehumidifier and upstream of the first heat exchanger.

6. The device of claim 1, wherein the chamber includes a fan.

7. The device of claim 1, wherein the chamber includes a nebulizer connected to the second conduit.

8. The device of claim 1, further comprising:
a flow control valve affixed in the fifth conduit downstream of the first heat exchanger and upstream of the reactor to control a flow of vapor therebetween.

9. The device of claim 1, wherein the first heat exchanger is connected to an external system via a sixth conduit to output the cooled dehumidified air.

10. The device of claim 1, wherein the one or more metals is a packed bed of aluminum alloy pellets.

11. The device of claim 1, wherein chamber is connected to the fuel cell via an seventh conduit.

12. The device of claim 1, wherein the reactor is connected to the fuel cell via an eighth conduit.

13. The device of claim 1, further comprising:
a pump connected to the dehumidifier.

14. The device of claim 13, wherein the pump is configured to connect to the fuel cell via a ninth conduit.

15. The device of claim 1, wherein the reactor includes a fan.

16. A fuel cell system, comprising:
a dehumidifier; a chamber; a first heat exchanger; and a reactor, the dehumidifier being connected to the chamber via a first conduit and a second conduit and being connected to the first heat exchanger via a third conduit, the dehumidifier being configured to receive a first solution from the chamber via the first conduit;

the chamber being connected to the first heat exchanger via a fourth conduit and being configured to receive from the dehumidifier a second solution via the second conduit, the first heat exchanger being connected to the reactor via a fifth conduit and being configured to receive and cool vapor from the chamber via the fourth conduit and cool dehumidified air received from the dehumidifier via the third conduit, the reactor being connected to the fuel cell via a sixth conduit and configured to receive cooled vapor from the first heat exchanger via the fifth conduit, the reactor enclosing therein one or more metals to react with the cooled vapor, and the fuel cell being configured to generate power based on reaction feedstock received from the reactor via the sixth conduit.

17. The system of claim 16, further comprising:
a pump connected to the dehumidifier,
wherein the pump is connected to the fuel cell to receive power therefrom.

18. The system of claim 16, wherein the chamber is connected to the fuel cell via a seventh conduit.

19. The system of claim 16, wherein the fuel cell is connected to the reactor via an eighth conduit.

20. A method for generating power, the method comprising:
receiving, in a dehumidifier having a first solution, ambient air;
generating, in the dehumidifier, dehumidified air and outputting the dehumidified air to a heat exchanger;
hydrating, in the dehumidifier and by the ambient air, the first solution and outputting a second solution to a chamber;
generating, in the chamber and from the second solution, a first cooled vapor and outputting the cooled vapor to the heat exchanger;
cooling, at the heat exchanger, the dehumidified air and the first cooled vapor and outputting a second cooled vapor to a reactor;
generating, at the reactor from the second cooled vapor, hydrogen and outputting the hydrogen to a fuel cell; and
generating, at a fuel cell, power from the hydrogen.

* * * * *